(12) United States Patent
Song et al.

(10) Patent No.: US 8,634,595 B2
(45) Date of Patent: Jan. 21, 2014

(54) METHOD FOR DYNAMICALLY SETTING ENVIRONMENTAL BOUNDARY IN IMAGE AND METHOD FOR INSTANTLY DETERMINING HUMAN ACTIVITY

(75) Inventors: Kai-Tai Song, Hsinchu (TW); Wei-Jyun Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 244 days.

(21) Appl. No.: 13/207,782

(22) Filed: Aug. 11, 2011

(65) Prior Publication Data

US 2012/0281918 A1 Nov. 8, 2012

(30) Foreign Application Priority Data

May 4, 2011 (TW) .............................. 100115553 A

(51) Int. Cl.
*G06K 9/00* (2006.01)
*G06K 9/48* (2006.01)
*G06K 9/54* (2006.01)
(52) U.S. Cl.
USPC ............................ 382/107; 382/199; 382/305
(58) Field of Classification Search
USPC ......... 382/103, 107, 153, 190, 199, 236, 305; 348/143, 148, 149, 158; 386/226
See application file for complete search history.

(56) References Cited

U.S. PATENT DOCUMENTS 6,049,281 A * 4/2000 Osterweil .................. 340/573.4
7,303,341 B2 * 12/2007 Itzkowitz ..................... 396/421
8,224,026 B2 * 7/2012 Golan et al. .................. 382/103
8,284,254 B2 * 10/2012 Romanowich et al. ....... 348/154
2008/0273754 A1 * 11/2008 Hick et al. .................... 382/103

FOREIGN PATENT DOCUMENTS

TW  I335181  6/2008
TW  I322963  8/2008

OTHER PUBLICATIONS

Chen et al., "Image-Based Human Activity Detection for Robotic Applications". Institute of Electrical Control Engineering, National Chiao Tung University, Published Apr. 2011.

* cited by examiner

*Primary Examiner* — Daniel Mariam
(74) *Attorney, Agent, or Firm* — Edwards Wildman Palmer LLP; Peter F. Corless; Steven M. Jensen

(57) ABSTRACT

The present invention provides a method for dynamically setting an environmental boundary in an image and a method for instantly determining human activity according to the method for dynamically setting the environmental boundary. The method for instantly determining human activity includes the steps of retrieving at least an initial environmental image with a predetermined angle, and calculating a boundary setting equation of an object and an environmental boundary in the initial environmental image; retrieving a dynamic environmental image having the object by using a movable platform, and figuring out a new environmental boundary; determining a human image in the dynamic environmental image, recording retention time of the human image, and determining a human posture; and determining human location according to the environmental boundary in the dynamic environmental image and the human image, and instantly determining the human activity.

7 Claims, 4 Drawing Sheets

METHOD FOR DYNAMICALLY SETTING ENVIRONMENTAL BOUNDARY IN IMAGE AND METHOD FOR INSTANTLY DETERMINING HUMAN ACTIVITY

CROSS-REFERENCES TO RELATED APPLICATIONS

This application claims under 35 U.S.C. §119(a) the benefit of Taiwanese Application No. 100115553, filed May 4, 2011, the entire contents of which is incorporated herein by reference.

BACKGROUND OF THE INVENTION

1. Field of the Invention

The present invention relates to a method for setting dynamic environmental boundaries based on a combination of human postures and local information, and a method for instantly determining the content of human activity according to the method for setting dynamic environmental boundaries.

2. Description of Related Art

In monitor security and home care industry, it is very important to use image identification technology such as those disclosed in Taiwanese Patent No. I335181 and Taiwanese Patent No. I322963.

Taiwanese Patent No. I335181 discloses a system, a method and a device for detecting human behaviors, wherein a plurality of cameras are arranged surrounding a specific place for recording monitored images, moving objects in the monitored images are detected by a dynamic image detection device, and an event such as falling down of the object is analyzed by an event analyzing device. Taiwanese Patent No. I322963 discloses a human activity recognition method, which uses template posture matching and fuzzy rule reasoning to recognize an action.

However, the technologies disclosed in the above two patents lack precision and practical utility owing to fixed cameras and lack of environmental boundaries. Particularly, the cameras are initially set and fixed for the specific environment; however, if the cameras are movable, the system fails to have precise identification according to the recorded images. Further, owing to the lack of environmental boundaries, the identification is performed according to the images to show only body postures but not exact content of the images. Moreover, various service robots with cameras have been developed for security and home care, whereas the above technology cannot satisfy human activity analysis when a movable camera onboard robot.

Accordingly, it is an urgent issue to provide a technology for instantly identifying activity content of an image without being limited by conventional fixed cameras.

SUMMARY OF THE INVENTION

The present invention provides a technology applicable to a movable camera for instantly determining the content of human image.

The present invention provides a method for dynamically setting an environmental boundary in an image. The method includes the steps of: retrieving at least an initial environmental image with a predetermined angle, setting an object and an environmental boundary in the initial environmental image, and figuring out a boundary setting equation of the object and the environmental boundary in the initial environmental image; retrieving a dynamic environmental image having the object by using a movable platform, and determining and calculating a position of the object in the dynamic environmental image; and figuring out an environmental boundary in the dynamic environmental image according to the boundary setting equation and the position of the object in the dynamic environmental image.

The present invention further provides a method for instantly determining human activity. The method includes the steps of: retrieving at least an initial environmental image with a predetermined angle, and figuring out a boundary setting equation of an object and an environmental boundary in the initial environmental image; retrieving a dynamic environmental image having the object by using a movable platform with any angle, and figuring out an environmental boundary in the dynamic environmental image by using the boundary setting equation and a position of the object in the dynamic environmental image; determining a human image in the dynamic environmental image, recording retention time of the human image, and determining a human posture by using the human image; and determining human location according to the environmental boundary in the dynamic environmental image and the human image, and instantly determining the human activity according to the human location, the human posture and the retention time.

In comparison with the prior art, the present invention has no need to arrange multiple fixed cameras in advance, so as to eliminate limitations resulting from the fixed cameras. Further, the present invention determines an object of an image, and then figures out a new environmental boundary according to a boundary setting equation, such that the present invention precisely determines images even though the camera is moved or changes its angle. Moreover, the present invention automatically updates environmental boundaries, records retention time and determines human postures in images, and therefore, the present invention more instantly and precisely determines the content of the human image than the conventional technology.

DETAILED DESCRIPTION OF THE PREFERRED EMBODIMENTS

The detailed description of the present invention is illustrated by the following specific examples. Persons skilled in the art can conceive the other advantages and effects of the present invention based on the disclosure contained in the specification of the present invention.

Referring to FIG. 1 to FIG. 6, a method for dynamically setting an environmental boundary in an image and a method for instantly determining human activity are illustrated.

Figure 1:
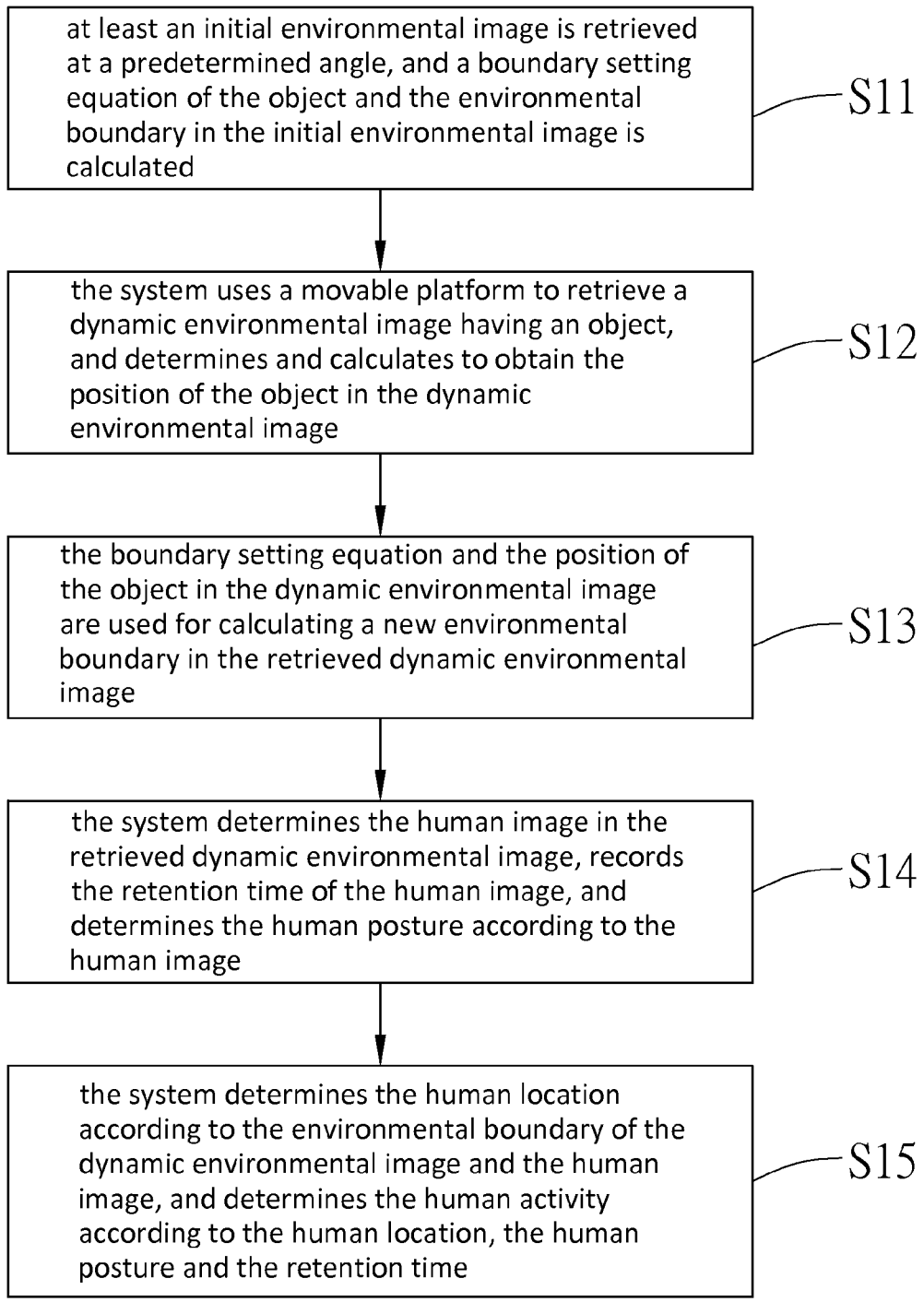
FIG. 1 is a block diagram showing the method disclosed in the present invention.
Figure 2:
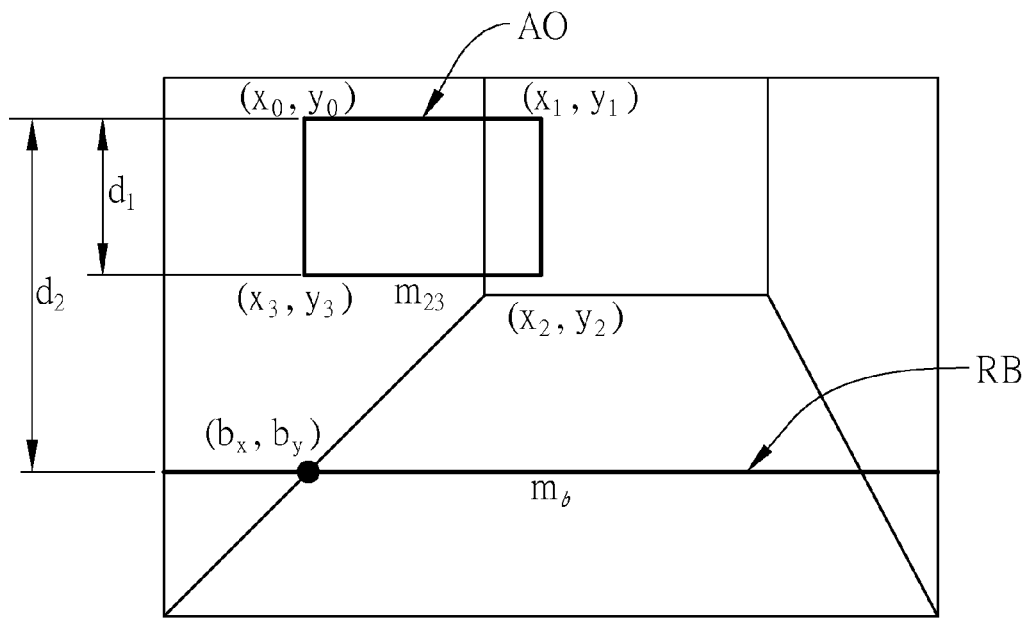
FIG. 2 is a schematic view showing space having an object and environmental boundaries.
Figure 3:
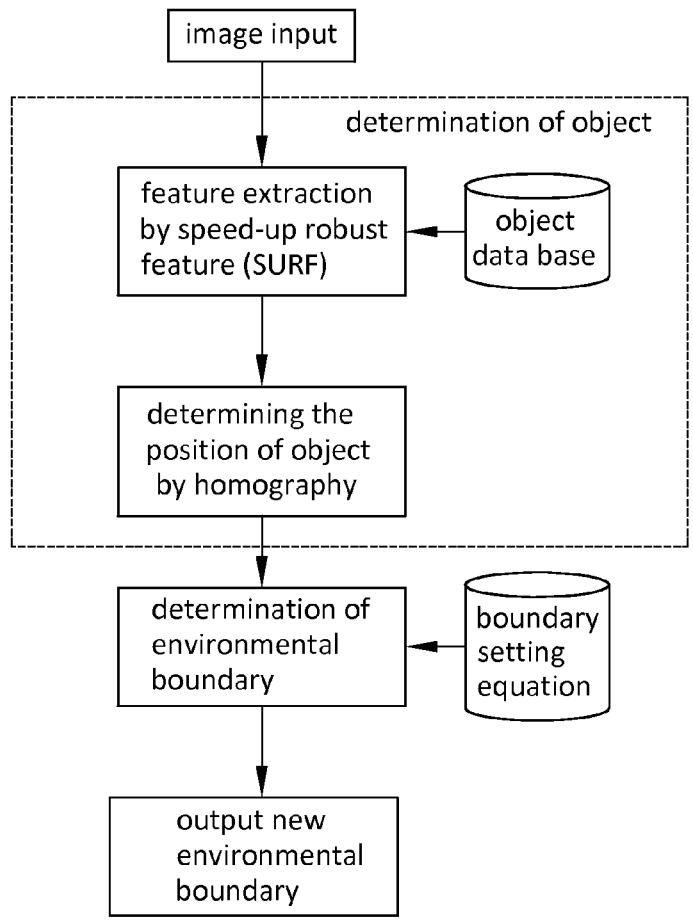
FIG. 3 is a block diagram showing the position of the object in the dynamic environmental image and the environmental boundary corresponding to the dynamic environmental image.
Figure 4:
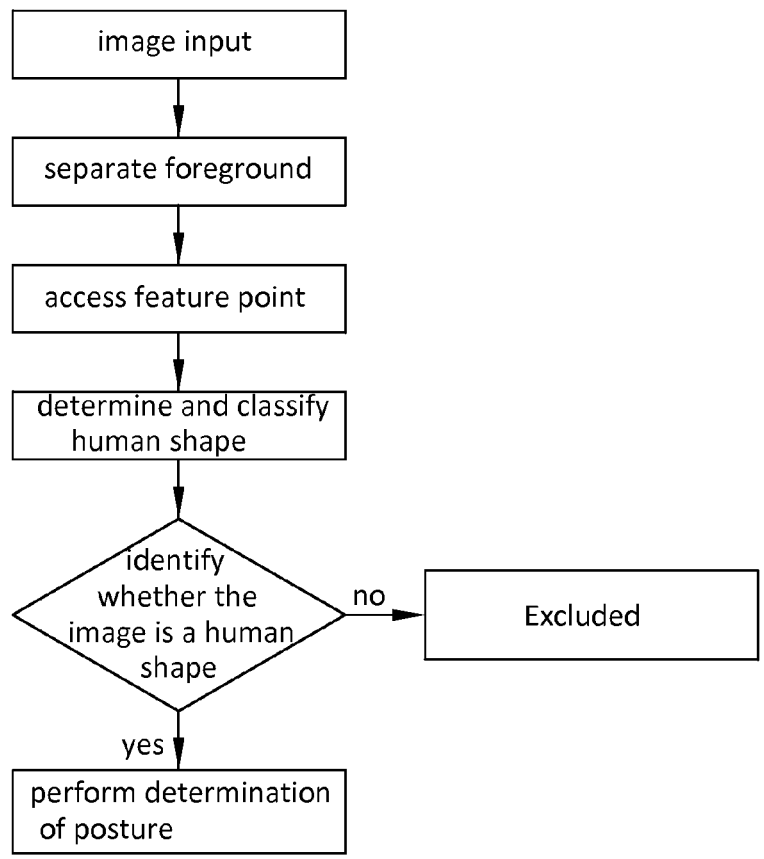
FIG. 4 is a flow chart showing determination of the human image in the dynamic environmental image.
Figure 5:
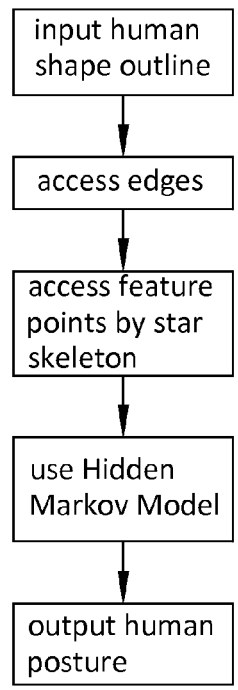
FIG. 5 is a block diagram showing determination of the human posture in the dynamic environmental image.
Figure 6:
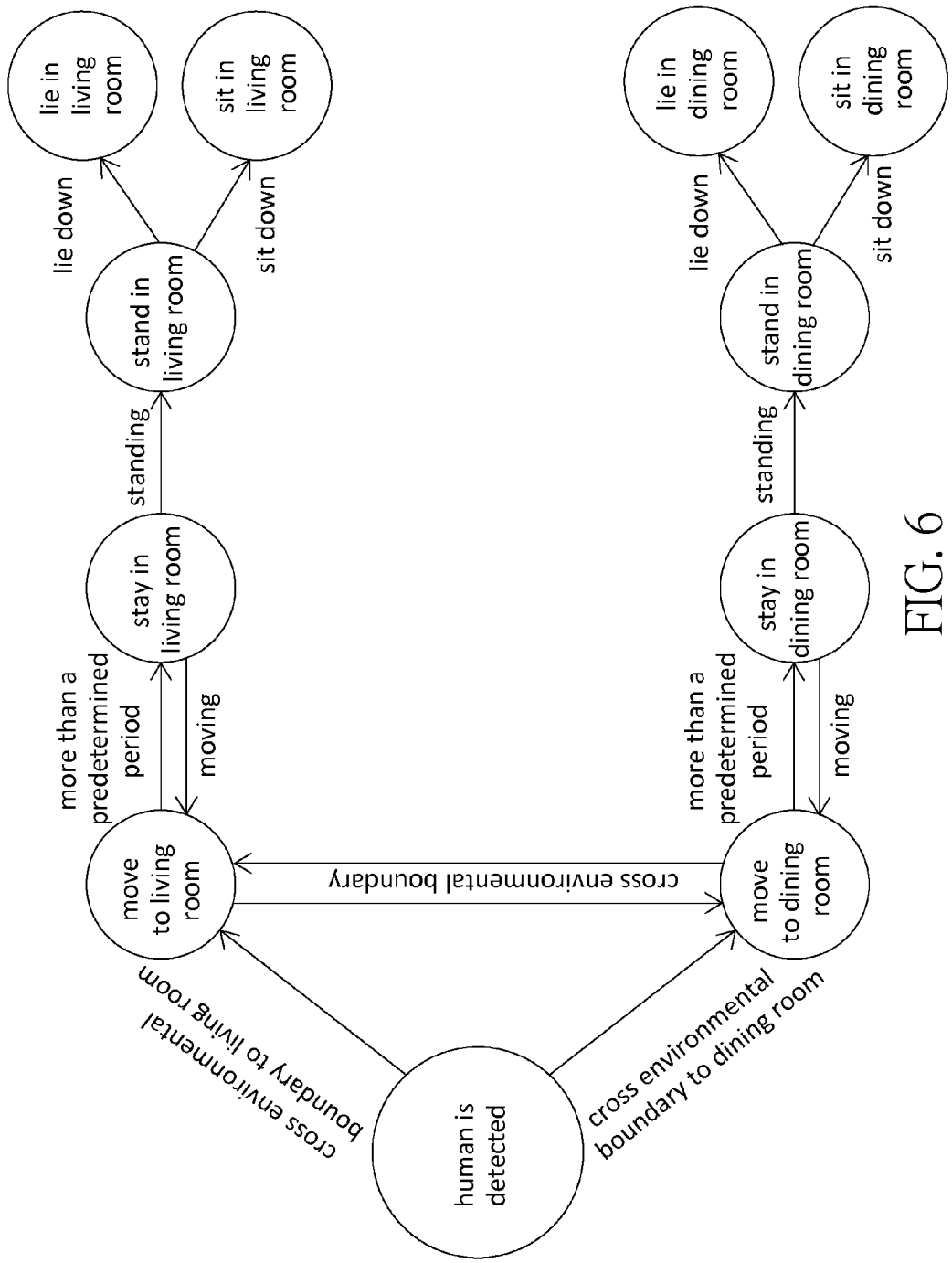
FIG. 6 is a schematic view showing the finite state machine for determining the human activity.

FIG. 1 is a block diagram showing the method disclosed in the present invention; FIG. 2 is a schematic view showing space having an object and environmental boundary; FIG. 3 is a block diagram showing the position of the object in the dynamic environmental image and the environmental boundary corresponding to the dynamic environmental image; FIG. 4 is a flow chart showing determination of the human image in the dynamic environmental image; FIG. 5 is a block diagram showing determination of the human posture in the dynamic environmental image; and FIG. 6 is a schematic view showing the finite state machine for determining the human activity. The method for dynamically setting an environmental boundary in an image is illustrated in the steps S11 to S13.

In step S11, at least an initial environmental image is retrieved at a predetermined angle, an object and an environmental boundary in the initial environmental image are set, and a boundary setting equation of the object and the environmental boundary in the initial environmental image is figured out.

Specifically, while step S11 was performed in a system (not shown), the indoor space as shown in FIG. 2 was used as predetermined environment to be monitored, wherein there may or may not be people in the environment. Then, a plane object was used as an assigned object in the indoor space as shown in FIG. 2, and the features of the object were stored in an associated object data base. Meanwhile, a boundary line was made as room boundary (as shown in FIG. 2) in the indoor space for dividing different room areas. Practically, the assigned object may be a frame in indoor space, and the room boundary may be a boundary for dividing a dining room and a living room in the indoor space.

The present invention uses a movable camera such as a movable platform, retrieves an initial environmental image having at least an assigned object and a room boundary, and figures out the boundary setting equation based on coordinates of image plane, slopes of image plane and difference of image height of the assigned object and the room boundary in the initial environmental image.

Referring to FIG. 2, more detailed boundary setting equation of the assigned object and the room boundary are described. As shown in FIG. 2, coordinates of four corners of the assigned object in the initial environmental image are $(x_0, y_0)$, $(x_1, y_1)$, $(x_2, y_2)$ and $(x_3, y_3)$, the height of the assigned object is $d_1 = y_3 - y_0$, the slope of the bottom line of the assigned object is $$m_{23} = \frac{y_2 - y_3}{x_2 - x_3},$$

and the room boundary (environmental boundary) is formed by a reference point $(b_x, b_y)$ and the slope $m_b$. In order to simplify the illustration, the room boundary and the assigned object are set to be parallel to each other, i.e. $m_b = m_{23}$ and the reference point is set as $(b_x, b_y) = (x_0, y_0 - d_2)$.

$d_1$ and $d_2$ are obtained from three (farthest, intermediate and closest) distances so as to obtain the y coordinate of the environmental boundary and the equation of the assigned object and the environmental boundary, wherein the farthest distance is referred to the farthest distance of the camera at which distance the assigned object in the initial environmental image is still clearly identified; the closest distance is referred to the distance of the camera at which distance the environmental boundary in the initial environmental image is going to disappear; and the intermediate distance is defined to be between the farthest and the closest distances.

For example, it is assumed in the system that $d_1$ and $d_2$ satisfy $d_2 = \alpha^* d_1^2 + \beta^* d_1 + \gamma$. In this example, while the camera is at the farthest distance, $d_1$ is measured to be 71 and $d_2$ is measured to be 257; while the camera is at the intermediate distance, $d_1$ is measured to be 93 and $d_2$ is measured to be 341; and while the camera is at the closest distance, $d_1$ is measured to be 114 and $d_2$ is measured to be 449. The system would put the measured d1 and d2 values in the equation, and then it would be obtained that $\alpha$ is 0.0308, $\beta$ is $-1.2341$, $\gamma$ is 229.3572 and $d_2 = 0.0308^* d_1^2 - 1.2341^* d_1 + 229.3572$. Thus, the correlations, $$m_{23} = \frac{y_2 - y_3}{x_2 - x_3},$$

(bx, by)=(x0, y0−d2) and $d_2 = 0.0308^* d_1^2 - 1.2341^* d_1 + 229.3572$ are stored, and these correlations are used for forming the boundary setting equation of the assigned object and the environmental boundary.

In step S12, the system uses a movable camera such as a movable platform, retrieves a dynamic environmental image having an object with any angle, determines the object in the dynamic environmental image, and figures out the position of the object in the dynamic environmental image. Specifically, after the initial setting is done in step S11, the system allows the movable platform to move, and dynamically retrieves at least one dynamic environmental image. At this time, the retrieved dynamic environmental image includes the object, but has some difference from the previously retrieved image at the initial setting. Therefore, the system determines the object from the retrieved dynamic environmental image after movement, and then figures out the position of the object in the retrieved dynamic environmental image after movement.

In step S13, the boundary setting equation obtained in step S11 and the position of the object obtained in step S12 are used for figuring out a new environmental boundary in the retrieved dynamic environmental image after the movement of the movable platform.

Referring to FIG. 3, steps S12 and S13 are described in detail. As shown in FIG. 3, after the movable platform inputs the retrieved dynamic environmental image into the system, the system performs feature extraction by speed-up robust feature (SURF), performs comparison with the data in the object data base, and determines the object in the retrieved dynamic environmental image after movement. After the determination of the object in the dynamic environmental image, the position of the object is determined by homography, and then the coordinates of the object in the dynamic environmental image are obtained. Then, the boundary setting equation obtained in step S11 is used for determining and further outputting the new environmental boundary in the dynamic environmental image.

In step S14, the system determines the human image in the retrieved dynamic environmental image after movement, records the retention time of the human image, and determines the human posture according to the human image.

In step S14, FIG. 4 illustrates the detailed description that the system determines the human image of the dynamic environmental image. After the movable platform inputs the retrieved dynamic environmental image, the system separates the background image to retrieve the foreground of the dynamic environmental image, accesses a specific area to be determined from the foreground by using the pixel projection technology, accesses a feature point from the specific area by using histogram of oriented gradient (HOG), and determines and classifies the human activity by using the support vector machine (SVM). After the classification, it is determined whether the image is a human image. If the image is not a human image, the image is excluded; however, if the image is determined to be a human image, the determination of posture is performed.

During the determination of posture, as shown in FIG. 5, the system inputs the human shape outline of the dynamic environmental image, extracts the edges to output human shape edges, accesses feature points by using the star skeleton technology to output the number sequence of the skeleton, and then determines the human posture by using the Hidden Markov model (HMM), so as to determine and output the human posture.

In step S15, the system determines the location of human according to the environmental boundary of the dynamic environmental image in step S15 and the human image determined in step S14, and determines the human activity according to the location of human, the human posture determined in step S14 and the retention time recorded in step S14.

Specifically, in step S15, all information are integrated by the finite state machine (FSM) as shown in FIG. 6, and then the determination and identification are performed. Referring to the finite state machine in FIG. 6, while the human is detected, the finite state machine determines which area the human locates at according to the new environmental boundary. For example, if the system sets two areas, a dining room and a living room, the finite state machine may determines the area into which the human is walking according to the new environmental boundary. When the human stays for more than a predetermined period (such as 10 frames), the system determines that the human stays in this area. For example, while the human is walking into the living room, the human activity is determined to be "moving to the living room". After determining the area at which the human is locating, the system further determines the human activity according to the human posture and retention time such as "sitting in the living room" or "lying in the dining room" and records the human activity.

In comparison with the prior art, the present invention automatically figures out a new environmental boundary according to the boundary setting equation of the object and the environmental boundary after the movement of the camera. Therefore, the present invention precisely provides the human posture, the location of the human and retention time, and also precisely determines the human activity according to the human posture, the location and the retention time, such that the present invention provides long distance home care, monitor security and more applications. Moreover, the present invention is applicable to a movable platform for retrieving images with multiple angles, such that there is no need to arrange a plurality of fixed cameras, operators and sensors associated with the platform, and the present invention provides low cost of the system in the future security or home care robot applications. In one embodiment, the present invention is practiced with a web camera with 300,000 pixel resolution and a movable robot, and the test result showed the precision of the human determination was at least 95.33% and the precision of the human posture determination was at least 94.8%.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

The invention claimed is:

1. A method for instantly determining human activity, comprising the steps of:
    retrieving a first image of an environment using a camera at a first angle and a first location and figuring out a boundary setting equation of a reference object and a first environmental boundary in the first image of the environment;
    retrieving a second image of the environment where the reference object is located using the camera at a second angle and a second location different from the first angle and the first location, respectively, and figuring out a second environmental boundary in the environment based on the boundary setting equation and a position where the reference object is in the second image of the environment;
    determining a third image of a person who is in the environment, recording retention time of the person staying in the environment, and determining a posture of the person based on the third image; and
    determining a position where the person is located in the environment according to the second environmental boundary and the third image, and determining activities of the person according to the position and the posture of the person, and the retention time,
    wherein the method is performed using a processor.

2. The method of claim 1, wherein the environmental boundary equation is figured out based on coordinates, slopes and difference of heights of the reference object in the first and second images of the environment.

3. The method of claim 1, wherein the person in the third image is determined by retrieving a foreground image, accessing a specific area in the foreground image by using pixel projection, accessing a specific point in the specific area via histogram of oriented gradient, and processing the specific point by a support vector machine (SVM).

4. The method of claim 1, wherein the posture of the person is determined by star skeleton technology and Hidden Markov model.

5. The method of claim 1, wherein the steps of determining a position where the person is located in the environment and determining activities of the person are performed by a finite state machine.

6. A method for dynamically setting an environmental boundary in an image, comprising the steps of:
    retrieving a first image of an environment using a camera at a first angle and a first location, setting a reference object and a first environmental boundary in the environment, and figuring out a boundary setting equation of the reference object and the first environmental boundary in the initial environmental image;
    retrieving a second image of the environment where the reference object is located using the camera at a second angle and a second location different from the first angle and the first location, respectively, and determining a position of the reference object in the second image of the environment; and
    figuring out a second environmental boundary in the environment according to the boundary setting equation and the position of the reference object in the second image of the environment,
    wherein the method is performed using a processor.

7. The method of claim 6, wherein the environmental boundary equation is figured out based on coordinates, slopes and difference of heights of the reference object in the first and second images of the environment.

* * * * *